US009849428B2

(12) United States Patent
Stasiak et al.

(10) Patent No.: US 9,849,428 B2
(45) Date of Patent: Dec. 26, 2017

(54) HYDROPHILICALLY MODIFIED FLUORINATED MEMBRANE (VI)

(71) Applicant: PALL CORPORATION, Port Washington, NY (US)

(72) Inventors: Marcin Stasiak, Port Washington, NY (US); Hassan Ait-Haddou, Melville, NY (US)

(73) Assignee: Pall Corporation, Port Washington, NY (US)

(*) Notice: Subject to any disclaimer, the term of this patent is extended or adjusted under 35 U.S.C. 154(b) by 417 days.

(21) Appl. No.: 14/700,952

(22) Filed: Apr. 30, 2015

(65) Prior Publication Data

US 2016/0317982 A1  Nov. 3, 2016

(51) Int. Cl.
| | | |
|---|---|---|
| *B01D 71/80* | (2006.01) |
| *B01D 67/00* | (2006.01) |
| *B01D 69/12* | (2006.01) |
| *B01D 71/32* | (2006.01) |
| *B01D 71/36* | (2006.01) |
| *B01D 71/34* | (2006.01) |
| *B01D 71/58* | (2006.01) |
| *B01D 71/40* | (2006.01) |

(52) U.S. Cl.
CPC ......... *B01D 71/80* (2013.01); *B01D 67/0088* (2013.01); *B01D 69/12* (2013.01); *B01D 69/125* (2013.01); *B01D 71/32* (2013.01); *B01D 71/40* (2013.01); *B01D 2323/02* (2013.01); *B01D 2323/30* (2013.01); *B01D 2323/345* (2013.01); *B01D 2325/24* (2013.01); *B01D 2325/36* (2013.01)

(58) Field of Classification Search
None
See application file for complete search history.

(56) References Cited

U.S. PATENT DOCUMENTS

| 3,417,035 A | 12/1968 | Elmer et al. |
| 3,483,141 A | 12/1969 | Litt et al. |
| 3,574,784 A | 4/1971 | Litt et al. |
| 4,136,237 A | 1/1979 | Takahashi et al. |
| 4,470,859 A | 9/1984 | Benezra et al. |
| 4,975,507 A | 12/1990 | Asrar |
| 5,117,327 A | 5/1992 | Asrar et al. |
| 5,200,470 A | 4/1993 | Asrar |
| 5,219,662 A | 6/1993 | Grimminger et al. |
| 5,294,493 A | 3/1994 | Beckerbauer et al. |
| 5,418,277 A | 5/1995 | Ma et al. |
| 6,080,826 A | 6/2000 | Grubbs et al. |
| 6,303,725 B1 | 10/2001 | Chang et al. |
| 6,313,222 B1 | 11/2001 | Lin et al. |
| 6,436,476 B1 | 8/2002 | Sage, Jr. |
| 6,492,443 B1 | 12/2002 | Kodemura et al. |
| 6,653,424 B1 | 11/2003 | Sakamoto et al. |
| 6,677,418 B1 | 1/2004 | Feast et al. |
| 6,987,154 B2 | 1/2006 | Choi et al. |
| 7,232,917 B2 | 6/2007 | Sumida et al. |
| 7,514,499 B2 | 4/2009 | Tam et al. |
| 8,143,369 B2 | 3/2012 | Fujiwara et al. |
| 8,223,472 B1 | 7/2012 | Dirk et al. |
| 8,283,410 B2 | 10/2012 | Musa |

(Continued)

FOREIGN PATENT DOCUMENTS

| CN | 102585245 A | 7/2012 |
| CN | 103721579 A | 4/2014 |

(Continued)

OTHER PUBLICATIONS

JP 2748515 B2 Takeo et al machine translation—machine translation of JP 2748515 B2 (also JP H02235928 A)—Takeo et al—May 6, 1998.*
14700952-548280-EICSEARCH.pdf—STIC structure search—Aug. 15, 2017.*
U.S. Appl. No. 14/675,547, filed Mar. 31, 2015.
U.S. Appl. No. 14/675,562, filed Mar. 31, 2015.
U.S. Appl. No. 14/675,585, filed Mar. 31, 2015.
U.S. Appl. No. 14/675,592, filed Mar. 31, 2015.
Intellectual Property Office of Singapore, Search Report in Singapore Patent Application No. 10201600623T, dated Mar. 29, 2016, 3 pp.
Faulkner et al., "Surface-Initiated Polymerization of 5-(Perfluoro-n-alkyl)norbornenes from Gold Substrates," *Macromolecules*, 43(3), Jan. 4, 2010, pp. 1203-1209.

(Continued)

*Primary Examiner* — Krishnan S Menon
*Assistant Examiner* — Bradley R Spies
(74) *Attorney, Agent, or Firm* — Leydig, Voit & Mayer, Ltd.

(57) ABSTRACT

Disclosed are copolymers suitable for hydrophilically modifying the surface of porous fluoropolymer supports, for example, a copolymer of the formula (I) or (II):

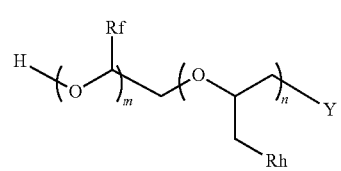

(I)

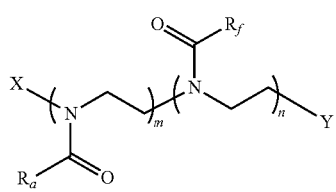

(II)

wherein Rf, Rh, Ra, Y, m, and n are as described herein. Also disclosed are a method of preparing the copolymers, a method of hydrophilically modifying porous fluoropolymer supports, hydrophilic fluoropolymer porous membranes prepared from the polymers, and a method of filtering fluids through the porous membranes.

20 Claims, No Drawings

(56) References Cited

U.S. PATENT DOCUMENTS

| | | |
|---|---|---|
| 8,410,290 B2 | 4/2013 | Fujiwara et al. |
| 8,431,625 B2 | 4/2013 | Luchterhandt et al. |
| 8,678,203 B2 | 3/2014 | Knapp et al. |
| 8,883,925 B2 | 11/2014 | Kizu et al. |
| 2006/0121217 A1 | 6/2006 | Childs et al. |
| 2008/0234451 A1 | 9/2008 | Kenwright et al. |
| 2009/0023877 A1 | 1/2009 | Liaw et al. |
| 2009/0030175 A1 | 1/2009 | Yamamoto et al. |
| 2009/0043059 A1 | 2/2009 | Liaw et al. |
| 2009/0182117 A1 | 7/2009 | Takeyama et al. |
| 2009/0188857 A1 | 7/2009 | Moore et al. |
| 2009/0264608 A1 | 10/2009 | Wakatsuki et al. |
| 2009/0269601 A1 | 10/2009 | Ishiguro et al. |
| 2009/0275719 A1 | 11/2009 | Ishiguro et al. |
| 2010/0056652 A1 | 3/2010 | Duong et al. |
| 2010/0230351 A1* | 9/2010 | Hoving ............... B01D 69/02 210/650 |
| 2011/0266220 A1 | 11/2011 | Campos et al. |
| 2012/0041137 A1 | 2/2012 | Musa et al. |
| 2012/0214940 A1 | 8/2012 | Hsu et al. |
| 2012/0245271 A1 | 9/2012 | Pawlow et al. |
| 2012/0288630 A1 | 11/2012 | Charkoudian et al. |
| 2013/0004690 A1 | 1/2013 | Mikhael et al. |
| 2013/0030136 A1 | 1/2013 | Sunaga et al. |
| 2013/0281644 A1 | 10/2013 | Kiessling et al. |
| 2013/0292872 A1 | 11/2013 | Knapp et al. |
| 2014/0357820 A1 | 12/2014 | Stephen et al. |

FOREIGN PATENT DOCUMENTS

| | | |
|---|---|---|
| EP | 0331307 A2 | 9/1989 |
| EP | 0682978 A1 | 11/1995 |
| EP | 1239000 A1 | 9/2002 |
| JP | S62-101696 A | 5/1987 |
| JP | S62-180116 A | 8/1987 |
| JP | H02-235928 A | 3/1989 |
| JP | H07-503289 T | 4/1995 |
| JP | 2010/029863 A | 2/2010 |
| JP | 2014/031412 A | 2/2014 |
| JP | 2014/205739 A | 10/2014 |
| JP | 2016/511288 T | 4/2016 |
| WO | WO 93/15255 | 8/1993 |
| WO | WO 94/10222 | 5/1994 |
| WO | WO 2010/117845 A2 | 10/2010 |
| WO | WO 2011/125323 A1 | 10/2011 |

OTHER PUBLICATIONS

Ivanova et al., "Micellar structures of hydrophilic/lipophilic and hydrophilic/fluorophilic poly(2-oxazoline) diblock copolymers in water", *Macromol. Chem. Phys.*, 2008, vol. 209, pp. 2248-2258.

Japanese Patent Office, Notice of Reasons for Rejection in Japanese Patent Application No. 2016-013576, (dated Dec. 20, 2016) 4 pp.

Korean Intellectual Property Office, Notice of Non-Final Rejection in Korean Patent Application No. 10-2016-0011254, (dated Jan. 26, 2017) 8 pp.

European Patent Office, Extended European Search Report in European Patent Application No. 16152959.9, (dated Sep. 20, 2016) 6 pp.

Taiwanese Intellectual Property Office, Office Action issued in Taiwanese Patent Application No. 105102438, (dated Sep. 18, 2017) 6 pp.

\* cited by examiner

HYDROPHILICALLY MODIFIED FLUORINATED MEMBRANE (VI)

BACKGROUND OF THE INVENTION

The properties of fluoropolymer membranes, for example, porous PTFE membranes, including their mechanical strength, chemical resistance or inertness, non-adhesiveness, excellent dielectric property, thermal stability at high temperature and low coefficient of friction make them very attractive for various applications. However, for certain applications, it will be beneficial to modify the surface of PTFE without affecting its intrinsic properties. Efforts have been made to modify the surface and the chemical properties of PTFE membrane in order to improve the suitability of the membrane for specific applications. For example, efforts have included surface coating, blending, high energy surface modification, for example, broad band ultraviolet radiation or BBUV, where the membrane is exposed to a UV radiation of wavelength 250-450 nm, and plasma treatment, free radical, and ozone etching, atomic layer deposition, and synthesis of modified PTFE-like polymers. However, most of the efforts were focused on high energy treatment such as with BBUV or plasma. Though the exact mechanism of these surface modification approaches is not reported, it likely results from the formation of free radicals by main-chain bond scission since C—C bond strength is known to be ~40% lower than F—F bond. If a majority of the radical results from C—C scission or main polymer chain scission, it could decrease the mechanical and the chemical stability of the PTFE membrane. It is also known that plasma treatment is limited to the surface of the membrane which makes such modification less stable during a prolonged period of time.

The foregoing shows that there exists an unmet need for a surface modification of porous fluoropolymer membranes or supports to provide hydrophilic fluoropolymer porous membranes which are stable, and wherein the surface modification does not significantly affect the mechanical strength of the porous fluoropolymer supports or the resulting composite porous membranes.

BRIEF SUMMARY OF THE INVENTION

The invention provides a composite hydrophilic porous membrane comprising a porous fluoropolymer support and a coating comprising a copolymer of formula (I) or (II):

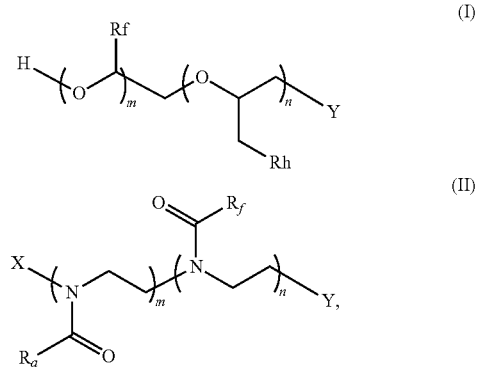

wherein the copolymer of formula (I) or (II) is a random or block copolymer, Rf is a perfluoro-substituted group, whereas Rh is a hydrophilic group or chlorine, Ra is methyl or ethyl, m and n are independently from 10 to 1000, X is an alkyl group, and Y is a reactive functional group, wherein the coating copolymer is optionally cross-linked.

The hydrophilic membranes of the invention have a critical wetting surface tension (CWST) of 33 dynes/cm or greater. The surface modification is stable to subsequent washing with common organic solvents used to dissolve the coating material.

The present invention further provides methods of preparing the copolymers and methods of preparing hydrophilically modified fluoropolymer porous membranes. The invention further provides methods of filtering fluids through these hydrophilically modified fluoropolymer porous membranes.

DETAILED DESCRIPTION OF THE INVENTION

In accordance with an embodiment, the invention provides a composite hydrophilic porous membrane comprising a porous fluoropolymer support and a coating comprising a copolymer of formula (I) or (II):

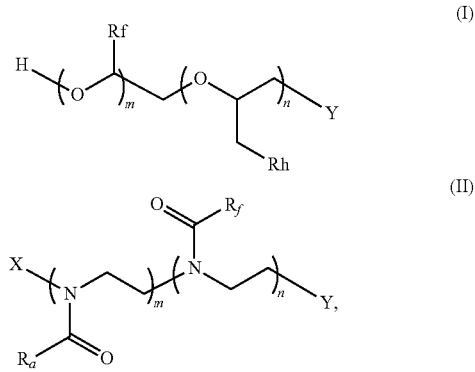

wherein the copolymer of formula (I) or (II) is a random or block copolymer, Rf is a perfluoro-substituted group, whereas Rh is a hydrophilic group or chlorine, Ra is methyl or ethyl, m and n are independently from 10 to 1000, X is an alkyl group, and Y is a reactive functional group, wherein the coating copolymer is optionally cross-linked.

In embodiments, n and m represent the degrees of polymerization of the respective monomers, and are independently from about 10 to about 1000, preferably from about 50 to about 400.

The respective monomer blocks can be present in the copolymer in any suitable mass %, for example, in an embodiment, from about 99%: about 1% to about 50%: about 50%, preferably from about 90%: about 10% to about 70%: about 30%, and more preferably from about 75%: about 25%.

The copolymer can be of any suitable molecular weight, for example, in an embodiment, a number or weight (Mn or Mw) average molecular weight from about 10 kDa to about 1000 kDa, preferably from about 20 kDa to about 200 kDa, and more preferably from about 40 kDa to about 100 kDa.

In an embodiment, Y is selected from amino, hydroxyl, acryloyl, and methacryloyl.

In any of the embodiments, Rf is a perfluoro-substituted alkyl group or chain, where alkyl chain may optionally contain one or more oxygen atoms in the chain. For example, Rf is $C_pF_{2p+1}$—$(CH_2)_q$ $(OCH_2)_r$, wherein p is 1 to 12, q is 0 to 3, and r is 0 to 2. Particular examples of Rf include $C_8F_{17}CH_2$, $C_6F_{13}(CH_2)_2OCH_2$, $C_4F_9CH_2$ and $CF_3$ for formula I and $C_pF_{2p+1}$—$CH_2CH_2$ for formula II.

In an embodiment of the copolymer of formula (I), Rf is selected from $C_8F_{17}CH_2$ and $C_6F_{13}(CH_2)_2OCH_2$.

In an embodiment of the copolymer of formula (II), Rf is $C_8F_{17}CH_2CH_2$.

In any of the embodiments, Rh is selected from hydroxyl, alkyloxy, chlorine, allyloxy, alkylthio or alkylthiopropyloxy, wherein the alkyl part of alkoxy, alkylthio, and alkylthiopropyloxy can be optionally substituted with hydroxyl, carboxylic acid, sulfonic acid, phosphonic acid, quaternary ammonium, alkylsulfone and/or heterocycle.

In an embodiment of the copolymer of formula (II), Ra is methyl.

In any of the embodiments, X is methyl.

In any of the embodiments, Y is a tertiary amino group or quaternary ammonium group, for example, piperidinyl, pyridinium, dimethylamino, or diethylamino.

Random copolymers of the formula (I) can be prepared by a process involving cationic ring opening polymerization of a mixture of substituted epoxides. For example, a mixture of epoxide monomers bearing suitable substituents can be polymerized by the use of a trialkylaluminum and an initiator salt having a halogen anion and an organic cation as a counterion. The organic cation in the salt having an organic cation as a counter cation is preferably an ammonium ion or a phosphonium ion, such as bis(triarylphosphoranylidene) ammonium ion, bis(trialkylphosphoranylidene)ammonium ion, and triarylalkylphosphonium ion, as described for example, in US 2009/0030175 A1. An example of triarylalkylphosphonium ion is $[MePPh_3]^+$, wherein Me is methyl. Thus, a mixture of monomers, perfluoroalkyl epoxy monomer and t-butyl glycidyl ether (TBGE), can be polymerized as illustrated below, and the resulting copolymer is further reacted with an acid such as trifluoroacetic acid to remove the pendant t-butyl groups.

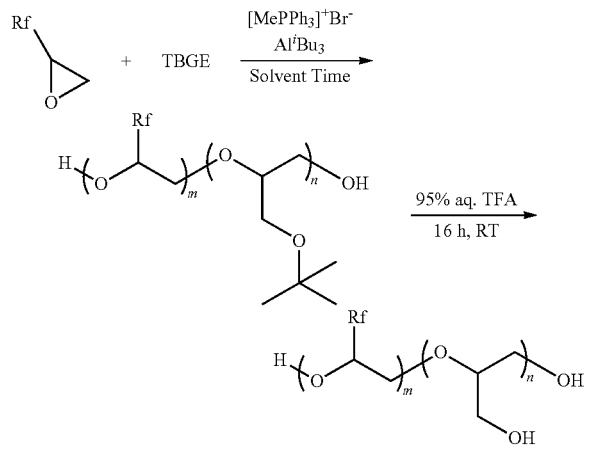

Block copolymers of the formula (I) can be prepared by a process involving sequential polymerization of an epoxide monomer having an Rf substituent, followed by the ring opening polymerization of another epoxide monomer with a suitable substituent, for example, an alkyl group. Thus, for example, in a first step, a homopolymer of a first monomer, an epoxide substituted with an Rf group, can be produced, and a second monomer having a substituted epoxide such as TBGE can be added and the polymerization continued to obtain a block copolymer.

Random copolymers of the formula (II) can be prepared by a process involving cationic ring opening polymerization of a mixture of two 2-substituted 2-oxazoline monomers: one monomer having an Rf substituent at the 2-position and another monomer having an Ra substituent at the 2-position.

Block copolymers of the formula (II) can be prepared by a process involving sequential cationic ring opening polymerization of an oxazoline monomer having an Ra substituent, such as 2-methyl-2-oxazoline, followed by cationic ring opening polymerization of another oxazoline monomer with an Rf substituent, e.g., PF8Et-oxazoline (wherein PF8Et is $C_8F_{17}CH_2CH_2$), as illustrated below:

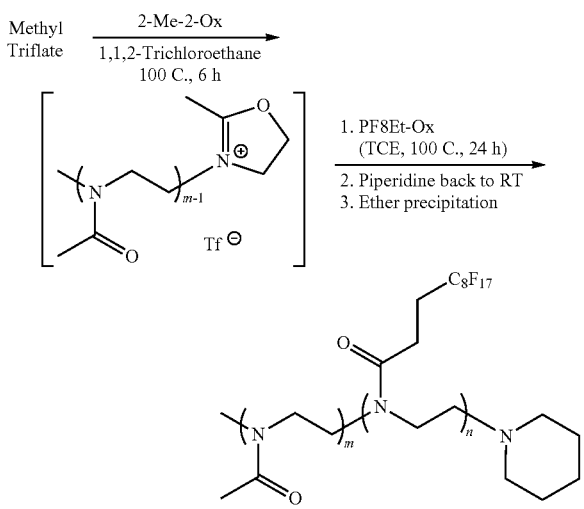

Alternatively, block copolymers of the formula (II) can be prepared by a process involving sequential cationic ring opening polymerization of a 2-oxazoline monomer having an Rf substituent at the 2-position, followed by a cationic ring opening polymerization of another 2-oxazoline monomer with an Ra substituent at the 2-position.

The 2-oxazoline monomer having an Rf substituent can be prepared by the reaction of a 3-perfluoroalkyl-propanoic acid and ethanolamine, or a 3-perfluoroalkyl-propionitrile with ethanolamine, as illustrated below:

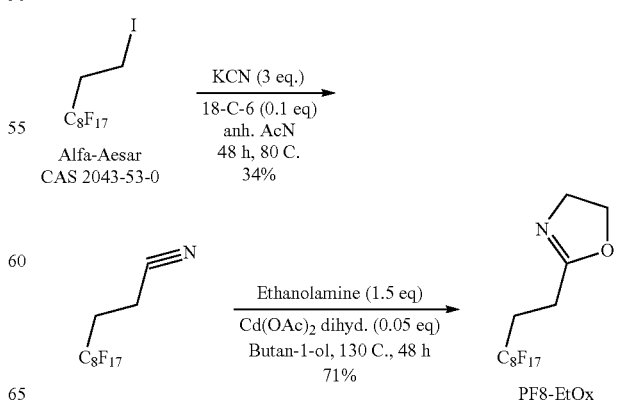

The polymerization of the monomers is conducted in a suitable solvent, for example, solvents generally used for conducting cationic ring opening polymerizations. Examples of suitable solvents include aromatic hydrocarbons such as benzene, toluene, and xylene, aliphatic hydrocarbons such as n-pentane, hexane, and heptane, alicylic hydrocarbons such as cyclohexane, and halogenated hydrocarbons such as dichloromethane, dichloroethane, dichloroethylene, tetrachloroethane, chlorobenzene, dichlorobenzene, and trichlorobenzene, as well as mixtures thereof.

The monomer concentration can be in the range of 1 to 50 wt %, preferably 2 to 45 wt %, and more preferably 3 to 40 wt %.

The polymerization can be carried out at any suitable temperature, for example, from −20 to +100° C., preferably 20 to 100° C.

To prepare a block copolymer, for example, the polymerization can be carried out for any time suitable to obtain the appropriate chain length of each of the blocks, which can be from about 1 minute to 100 hours.

The polymers can be isolated by a suitable technique, for example, precipitation with a nonsolvent or by the concentration of the suitably quenched reaction mixture.

The copolymers can be characterized for their molecular weights and molecular weight distributions by any known techniques. For example, a MALS-GPC technique can be employed. The technique uses a mobile phase to elute, via a high pressure pump, a polymer solution through a bank of columns packed with a stationary phase. The stationary phase separates the polymer sample according to the chain size followed by detecting the polymer by three different detectors. A series of detectors can be employed, e.g., an Ultraviolet detector (UV-detector), followed by a multi-angle laser light scattering detector (MALS-detector), which in turn, is followed by a refractive index detector (RI-detector) in a row. The UV-detector measures the polymer light absorption at 254 nm wavelength; the MALS-detector measures the scattered light from polymer chains relative to mobile phase.

In an embodiment, the copolymers can be further modified by the thiol-ene reaction of the pendant allyl moieties with hydrophilic thiols (e.g. thioglycerol, mercaptoacetic acid) according to typical procedures known to the skilled in the art.

In an embodiment, the copolymers can be further modified by the nucleophilic substitution reaction of the pendant chloromethyl moieties with hydrophilic thiols (e.g. thioglycerol, mercaptoacetic acid) according to typical procedures known to the skilled in the art, for example as described in *European Polymer Journal vol.* 43 (2007) 4516.

The copolymers can be further modified such that the copolymer includes crosslinkable reactive functional groups at Y. For example, one or more hydroxyl groups can be converted into an ester group with an acryloyl or methacryloyl chloride to provide acrylated or methacrylated copolymers. Alternatively, one or more hydroxyl groups can be coupled with an amino acid to provide aminoester functionality.

The present invention further provides a composite hydrophilic porous membrane comprising a porous fluoropolymer and a copolymer or polymer as described above, wherein the copolymer is optionally crosslinked.

The present invention further provides a method of hydrophilically modifying a porous fluoropolymer support comprising:
(i) providing a porous fluoropolymer support;
(ii) coating the porous fluoropolymer support with a solution comprising a solvent and a copolymer of formula I or II:

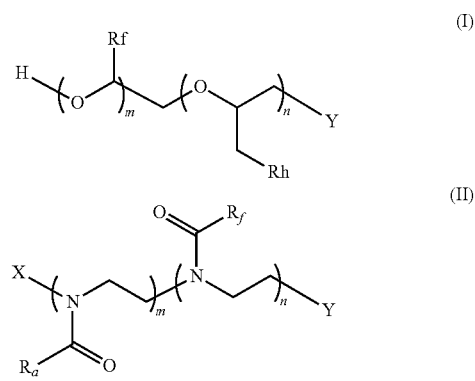

wherein the copolymer of formula (I) or (II) is a random or block copolymer, Rf is a perfluoro-substituted group, whereas Rh is a hydrophilic group or chlorine, Ra is methyl or ethyl, m and n are independently from 10 to 1000, X is an alkyl group, and Y is reactive functional group;
(iii) drying the coated support from (ii) to remove at least some of the solvent from the coating comprising a solvent and the copolymer; and optionally
(iv) crosslinking the copolymer present in the coating.

When Y has an acrylate or methacrylate functionality, crosslinking can be carried for example, by the use of a photoinitiator and a high energy radiation, e.g., UV. It is contemplated that the crosslinking would provide a highly stable polymer network in the membrane.

Any suitable photoinitiator can be used, for example, Type I and Type II photoinitiators. Examples of photoinitiators include camphor quinone, benzophenone, benzophenone derivatives, acetophenone, acetophenone derivatives, phosphine oxides and derivatives, benzoin alkyl ethers benzil ketals, phenylglyoxalic esters and derivatives thereof, dimeric phenylglyoxalic esters, peresters, halomethyltriazines, hexaarylbisimidazole/coinitiators systems, ferrocenium compounds, titanocenes, and combinations thereof.

The surface can be modified, for example, as follows: a sheet of PTFE porous support is coated at room temperature by pre-wetting the membrane sheet with IPA solvent and soaking the membrane in a coating polymer solution with concentration that ranges between 0.1% and 10% by mass. The coating time ranges between (1 min to 12 hours). After soaking the support, it is dried in convection oven at 100° C. to 160° C. The drying time ranges between (10 minutes to 12 h).

The change in surface modification in terms of surface tension is measured by measuring the CWST. The method relies on a set of solutions of certain composition. Each solution has specific surface tension. The solution's surface tension ranges from 25 to 92 dynes/cm in small nonequivalent increments. To measure the membrane surface tension, the membrane is positioned on to top of white light table, one drop of a solution of certain surface tension is applied to the membrane surface and the time the drop takes to penetrate through the membrane and become bright white as an indication of light going through the membrane is recorded. Instant wetting is considered when the time the drop takes to penetrate the membrane is ≤10 seconds. If the time>10 seconds, the solution is considered to partially wet the membrane.

In accordance with an embodiment of the invention, the hydrophilic fluoropolymer membrane is a porous membrane, e.g., a nanoporous membrane, for example, a membrane having pores of diameter between 1 nm and 100 nm, or a microporous membrane having pores of diameter between 1 μm and 10 μm.

Hydrophilic fluoropolymer porous membranes according to embodiments of the invention can be used in a variety of applications, including, for example, diagnostic applications (including, for example, sample preparation and/or diagnostic lateral flow devices), ink jet applications, lithography, e.g., as replacement for HD/UHMW PE based media, filtering fluids for the pharmaceutical industry, metal removal, production of ultrapure water, treatment of industrial and surface waters, filtering fluids for medical applications (including for home and/or for patient use, e.g., intravenous applications, also including, for example, filtering biological fluids such as blood (e.g., virus removal)), filtering fluids for the electronics industry (e.g., filtering photoresist fluids in the microelectronics industry and hot SPM), filtering fluids for the food and beverage industry, beer filtration, clarification, filtering antibody- and/or protein-containing fluids, filtering nucleic acid-containing fluids, cell detection (including in situ), cell harvesting, and/or filtering cell culture fluids. Alternatively, or additionally, porous membranes according to embodiments of the invention can be used to filter air and/or gas and/or can be used for venting applications (e.g., allowing air and/or gas, but not liquid, to pass therethrough). Porous membranes according to embodiments of the inventions can be used in a variety of devices, including surgical devices and products, such as, for example, ophthalmic surgical products.

In accordance with embodiments of the invention, the hydrophilic fluoropolymer porous membrane can have a variety of configurations, including planar, flat sheet, pleated, tubular, spiral, and hollow fiber.

Hydrophilic fluoropolymer porous membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive porous membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonate resin.

In accordance with an embodiment, the hydrophilic fluoropolymer porous membrane comprises any suitable porous fluoropolymer support, for example, a support made from PTFE, PVDF (polyvinylidene fluoride), PVF (polyvinyl fluoride), PCTFE (polychlorotrifluoroethylene), FEP (fluorinated ethylene-propylene), ETFE (polyethylenetetrafluoroethylene), ECTFE (poly ethylenechlorotrifluoroethylene), PFPE (perfluoropolyether), PFSA (perfluorosulfonic acid), and perfluoropolyoxetane. The porous support can have any suitable pore size, e.g., from about 2 nm to about 10 microns, preferably PTFE and PVDF.

The present invention further provides a hydrophilically modified fluoropolymer porous membrane produced by the method described above.

The present invention further provides a method of filtering a fluid, the method comprising passing the fluid through the hydrophilic fluoropolymer porous membranes described above.

The following examples further illustrate the invention but, of course, should not be construed as in any way limiting its scope.

Example 1

This example illustrates the synthesis of a copolymer of formula I in accordance with an embodiment of the invention.

An argon-purged 40 mL vial with septum was charged with methyltriphenylphosphonium bromide (37 mg; 0.1 mmol), degassed hexafluorobenzene (12 mL), followed by 1,2-epoxy-1H,1H,2H,3H,3H-heptadecafluoroundecane (2.83 mL; 10 mmol) and tert-butyl glycidyl ether (6.0 mL; 40 mmol). The reaction mixture was cooled in an ice-bath while stirring vigorously, followed by dropwise addition of 0.5M solution of triisobutylaluminum in hexane (2 mL; 1 mmol). Stirring was continued for 24 h while allowing the mixture to slowly warm up to ambient temperature. After that time reaction was quenched by addition of methanol/water mixture (4:1, 5 mL) stirring for 30 min, followed by concentration in vacuo. The concentrate was diluted with perfluorobutyl methyl ether (50 mL) and filtered through a pad of Celite. The filtrate was concentrated in vacuo to give 3.76 g of a viscous residue (38% of the monomer feed). NMR analysis (in $CDCl_3$) indicated that in the obtained polymer the molar fraction of the perfluoro-substituted unit was 20%, which was calculated by comparing integration of the tert-butyl signal to the signal of the $C_8F_{17}CH_2$ methylene protons.

Example 2

This example illustrates the synthesis of another copolymer of formula I in accordance with an embodiment of the invention.

Copolymer obtained as described in Example 1 (3.7 g) was dissolved in the trifluoroacetic acid/water mixture (95:5, 20 mL) and the solution was stirred at ambient temperature for 16 h. The reaction mixture was added to 150 mL of diethyl ether, followed by addition of 150 mL of hexane. The resinous precipitate that formed was isolated by decantation, washed with hexane and re-dissolved in methanol. The precipitation was repeated by the addition to vigorously stirred 10 volumes of diethyl ether/hexane 1:1 mixture. The resinous product was isolated by decantation, washed with hexane and dried in vacuo yielding 0.43 g of the copolymer. NMR analysis (in DMSO-$d_6$) confirmed full deprotection by complete disappearance of the tert-butyl signal. Results of elemental analysis (% C=40.48 and % F=22.73) estimated the molar ratio of the perfluoro-substituted unit in the copolymer as 34%.

Example 3

This example illustrates the synthesis of yet another copolymer of formula I in accordance with an embodiment of the invention.

An argon-purged 40 mL vial with septum was charged with methyltriphenylphosphonium bromide (37 mg; 0.1 mmol), degassed anhydrous toluene (12 mL), followed by 1,2-epoxy-1H,1H,2H,3H,3H-heptadecafluoroundecane (2.83 mL; 10 mmol) and tert-butyl glycidyl ether (3.0 mL; 20 mmol). The reaction mixture was then stirred vigorously, while adding 1.1M solution of triisobutylaluminum in toluene (0.9 mL; 1 mmol). A slightly exothermic reaction was observed while the mixture was becoming turbid and viscous. Stirring was continued for 24 h followed by quenching by addition of methanol/water mixture (4:1, 5 mL), then stirring for 30 min, followed by concentration in vacuo. The concentrate was then diluted with 100 mL of AK-225 solvent followed by filtration through a pad of Celite. The filtrate was concentrated in vacuo and the viscous residue was dispersed in 150 mL of methanol followed by liquid-liquid extraction with perfluorohexane (3 times with 40 mL). Concentration of the perfluorohexane layer to dryness gave fraction A, while concentration of the methanolic layer yielded fraction B, which were analyzed by NMR (in $CDCl_3$) by comparing the integrated areas of the tert-butyl signal to the signal of the $C_8F_{17}CH_2$ methylene protons.

Fraction A—1.20 g (16% of the monomer feed) contained 50 molar % of the perfluoro-substituted unit.

Fraction B—5.95 g (81% of the monomer feed) contained 36 molar % of the perfluoro-substituted unit.

Example 4

This example illustrates the synthesis of yet another copolymer of formula I in accordance with an embodiment of the invention.

Fraction A obtained as described in Example 3 (1.19 g) was dissolved in the trifluoroacetic acid/water mixture (95:5, 20 mL) and the solution was stirred at ambient temperature for 16 h. The reaction mixture was concentrated in vacuo, the residue obtained was redissolved in a minimum amount of diethyl ether followed by the addition of 10 volumes of hexane while stirring vigorously. The resinous precipitate formed was isolated by decantation, washed with hexane and dried in vacuum oven at 50° C. overnight, yielding 1.01 g of the final copolymer. NMR analysis (in TFE-$d_3$) confirmed complete removal of the pendant tert-butyl groups. Results of elemental analysis (% C=29.78 and % F=55.78) estimated the molar ratio of the perfluoro-substituted unit in the copolymer as 85%.

Example 5

This example illustrates the synthesis of yet another copolymer of formula I in accordance with an embodiment of the invention.

Fraction B obtained as described in Example 3 (5.90 g) was dissolved in the trifluoroacetic acid/water mixture (95:5, 80 mL) and the solution was stirred at ambient temperature for 16 h. The reaction mixture was concentrated in vacuo, residue redissolved in minimum amount of diethyl ether followed by addition of 10 volumes of hexane while stirring vigorously. The resinous precipitate formed was isolated by decantation, washed with hexane and dried in vacuum oven at 50° C. overnight, yielding 5.10 g of the final copolymer. NMR analysis (in TFE-$d_3$) confirmed complete removal of the pendant tert-butyl groups. Results of elemental analysis (% C=31.20 and % F=49.33) estimated the molar ratio of the perfluoro-substituted unit in the copolymer as 76%.

Example 6

This example illustrates the synthesis of yet another copolymer of formula I in accordance with an embodiment of the invention.

An argon-purged 40 mL vial with septum was charged with methyltriphenylphosphonium bromide (37 mg; 0.1 mmol), degassed anhydrous toluene (12 mL), followed by 3-[2-(perfluorohexyl)ethoxy]-1,2-epoxypropane (2.80 mL; 10 mmol) and allyl glycidyl ether (2.4 mL; 20 mmol). The reaction mixture was stirred vigorously while adding 1.1M solution of triisobutylaluminum in toluene (0.9 mL; 1 mmol). Stirring was continued for 24 h followed by quenching by the addition of methanol/water mixture (4:1, 5 mL), then stirring for 30 min, followed by concentration in vacuo. The concentrate obtained was diluted with 100 mL of AK-225 solvent followed by filtration through a pad of Celite. The filtrate was concentrated in vacuo and the resulting residue vacuum dried to yield 5.25 g of copolymer (80% of the monomer feed). NMR analysis (in $CDCl_3$) estimated the molar ratio of the perfluoro-substituted unit as 40%, as calculated by comparing the integration of the allyl methylene signal to that of the methylene adjacent to the $C_6F_{13}$ moiety.

Example 7

This example illustrates the synthesis of yet another copolymer of formula I in accordance with an embodiment of the invention.

An argon-purged 40 mL vial with septum was charged with methyltriphenylphosphonium bromide (37 mg; 0.1 mmol), degassed anhydrous toluene (12 mL), followed by 3-[2-(perfluorohexyl)ethoxy]-1,2-epoxypropane (2.80 mL; 10 mmol) and epichlorohydrin (1.6 mL; 20 mmol). The reaction mixture was stirred vigorously, while adding 1.1M solution of triisobutylaluminum in toluene (0.9 mL; 1 mmol). Stirring was continued for 24 h followed by quenching by the addition of methanol/water mixture (4:1, 5 mL), followed by stirring for 30 min, which was followed by concentration in vacuo. The concentrate was diluted with 100 mL of AK-225 solvent followed by filtration through a pad of Celite. The filtrate was concentrated in vacuo and the resulting residue vacuum dried to yield 5.58 g of copolymer (92% of the monomer feed). NMR analysis (in CDCl$_3$) estimated the molar ratio of the perfluoro-substituted unit as 35%, as calculated by comparing the integration of the methylene signal adjacent to the C$_6$F$_{13}$ moiety (2.30-2.50 ppm) with the integration of the remaining protons (3.45-3.80 ppm).

Example 8

This example illustrates the synthesis of intermediate towards copolymer of formula II in accordance with an embodiment of the invention.

3-(Perfluorooctyl)-propionitrile was synthesized from 1H,1H,2H,2H-heptafluorodecyl iodide as described in *Journal of Oleophobic Science* vol. 59 (2010) 483, and reacted with a slight excess of ethanolamine in presence of cadmium acetate dehydrate catalyst analogously as described in *Journal of Polymer Science: Part A Polymer Chemistry* vol. 32 (1994) 2187. The monomer was obtained in 71% yield and the structure thereof was confirmed by both $^1$H and $^{19}$F NMR analyses (in CDCl$_3$) and its high purity was confirmed by elemental analysis (Calculated: % C 30.19; % H 1.56; % N 2.71; % F 62.45; Found % C 30.26; % H 1.57; % N 2.76; % F 60.94).

Example 9

This example illustrates the synthesis of another copolymer of formula II in accordance with an embodiment of the invention.

An argon-purged 40 mL vial with septum was charged with methyl trifluoromethanesulfonate (9 µL; 0.08 mmol) diluted in degassed 1,1,2-trichloroethane (4 mL) followed by the addition of 2-methyl-2-oxazoline (2.0 mL; 24 mL) with a syringe with vigorous stirring. The contents of the vial were heated at 100° C. for 6 h, after which time the solution of the perfluoro-substituted oxazoline monomer described in Example 8 (2.07 g; 4 mmol) dissolved in 1,1,2-trichloroethane (10 mL) was added dropwise with a syringe via septum. The heating at 100° C. was continued for 16 h, followed by termination of the reaction by the addition of piperidine (0.1 mL) and allowing the reaction mixture to cool down to ambient temperature while continuing stirring overnight. The contents of the vial were added dropwise to vigorously stirred diethyl ether (300 mL) upon which the precipitation occurred. The product was collected by filtration, washed with copious amount of diethyl ether, followed by vacuum drying at ambient temperature, yielding 3.21 g (78% of the monomer feed). Both $^1$H and $^{19}$F NMR spectra conformed to the expected structure. GPC analysis performed with DMF (with 0.05N LiBr) as a mobile phase indicated M$_w$ of 26 kDa (vs. PMMA standard) with a polydispersity index of 1.58. The molar ratio of the perfluoro-substituted unit was estimated from elemental analysis (% N=12.99; % F=3.18) to be ca. 6%.

Example 10

This example illustrates the surface modifying property of the copolymers in accordance with embodiments of the present invention.

The fluoropolymer substrate, either PTFE or PVDF, was dip-coated by soaking in a solution of the copolymer (solvent and concentration indicated in the Table below) for 1 h at ambient temperature. This was followed by brief air-drying (until sample was no longer transparent), extensive washes in the solvent used for copolymer dissolution, followed by air-drying and testing the wettability of the coated membrane by measuring the CWST value, as compared to untreated PTFE control (CWST=25 dynes/cm) or untreated PVDF control (CWST=44 dynes/cm).

| Copolymer | Solvent/Concentration (w/v) | CWST, dynes/cm |
| --- | --- | --- |
| Example 2 | Methanol/1% | 48 (PTFE) |
| Example 2 | Acetone/Ethanol/Water (6:1:3)/0.3% | 58 (PTFE) |
| Example 4 | Acetone/0.5% | 40 (PTFE) |
| Example 5 | Acetone/0.5% | 63 (PTFE) |
| Example 9 | Methanol/1% | 33 (PTFE) |
| Example 9 | Methanol/1% | 53 (PVDF) |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A composite hydrophilic porous membrane comprising a porous fluoropolymer support and a coating comprising a copolymer of formula (I) or (II):

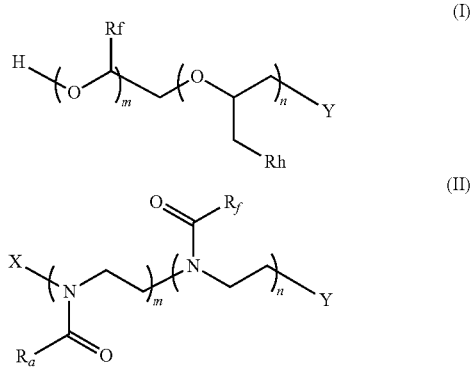

wherein the copolymer of formula (I) or (II) is independently a random or block copolymer, Rf is a perfluoro-substituted group, whereas Rh is a hydrophilic group or chlorine, Ra is methyl or ethyl, m and n are independently from 10 to 1000, X is an alkyl group, and Y is reactive functional group, wherein the coating is optionally crosslinked.

2. The composite hydrophilic porous membrane of claim 1, wherein Y is selected from amino, hydroxyl, acryloyl, and methacryloyl.

3. The composite hydrophilic porous membrane of claim 1, wherein Rf is perfluoro-substituted alkyl, where alkyl chain may optionally contain one or more oxygen atoms in the chain.

4. The composite hydrophilic porous membrane of claim 1, wherein Rf is $C_pF_{2p+1}$—$(CH_2)_q$ $(OCH_2)_r$, wherein p is 1 to 12, q is 0 to 3, and r is 0 to 2.

5. The composite hydrophilic porous membrane of claim 4, wherein Rf is independently selected from $C_8F_{17}CH_2$, $C_6F_{13}(CH_2)_2OCH_2$, $C_4F_9CH_2$ and $CF_3$ for formula I and $C_pF_{2p+1}$—$CH_2CH_2$ for formula II.

6. The composite hydrophilic porous membrane of claim 1, wherein the copolymer is of formula (I), and Rf is selected from $C_8F_{17}CH_2$ and $C_6F_{13}(CH_2)_2OCH_2$.

7. The composite hydrophilic porous membrane of claim 1, wherein the copolymer is of formula (II), and Rf is $C_8F_{17}CH_2CH_2$.

8. The composite hydrophilic porous membrane of claim 1, wherein Rh is selected from hydroxyl, alkyloxy, chlorine, allyloxy, alkylthio or alkylthiopropyloxy, where alkyl can be substituted with hydroxyl, carboxylic acid, sulfonic acid, phosphonic acid, quaternary ammonium, alkylsulfone and heterocycle.

9. The composite hydrophilic porous membrane of claim 8, wherein Rh is hydroxyl.

10. The composite hydrophilic porous membrane of claim 1, wherein Ra is methyl.

11. The composite hydrophilic porous membrane of claim 10, wherein X is methyl.

12. The composite hydrophilic porous membrane of claim 1, wherein Y is a tertiary amino group or quaternary ammonium group.

13. The composite hydrophilic porous membrane of claim 12, wherein the tertiary amino group or quaternary ammonium group is selected from piperidinyl, pyridinium, dimethylamino, and diethylamino.

14. A method of hydrophilically modifying a porous fluoropolymer support comprising:
(i) providing a porous fluoropolymer support;
(ii) coating the porous fluoropolymer support with a solution comprising a solvent and a copolymer of formula (I) or (II):

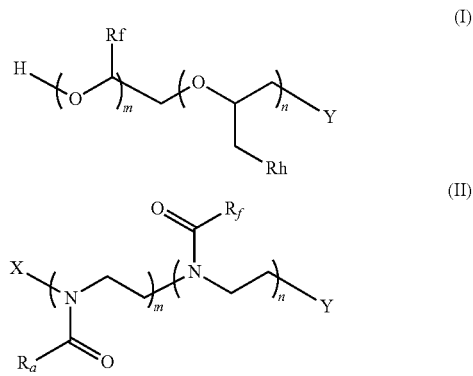

wherein the copolymer of formula (I) or (II) is independently a random or block copolymer, Rf is a perfluoro-substituted group, whereas Rh is a hydrophilic group or chlorine, Ra is methyl or ethyl, m and n are independently from 10 to 1000, X is an alkyl group, and Y is reactive functional group,
(iii) drying the coated support from (ii) to remove at least some of the solvent from the coating comprising a solvent and the copolymer; and optionally
(iv) crosslinking the copolymer present in the coating.

15. The method of claim 14, wherein, the Rf of the copolymer is a perfluoro-substituted alkyl, where alkyl chain may optionally contain oxygen atom.

16. The method of claim 14, wherein the Rf of the copolymer is $C_pF_{2p+1}$—$(CH_2)_q$ $(OCH_2)_r$, wherein p is 1 to 12, q is 0 to 3, and r is 0 to 2.

17. The method of claim 16, wherein Rf is selected from $C_8F_{17}CH_2$, $C_6F_{13}(CH_2)_2OCH_2$, $C_4F_9CH_2$ and $CF_3$ for Formula I and $C_pF_{2p+1}$—$CH_2CH_2$ for Formula II.

18. A hydrophilically modified porous fluoropolymer membrane produced by the method of claim 14.

19. The composite hydrophilic porous membrane of claim 1, wherein the porous fluoropolymer support is selected from PTFE, PVDF, PVF (polyvinyl fluoride), PCTFE (polychlorotrifluoroethylene), FEP (fluorinated ethylene-propylene), ETFE (polyethylenetetrafluoroethylene), ECTFE (poly ethylenechlorotrifluoroethylene), PFPE (perfluoropolyether), PFSA (perfluorosulfonic acid), and perfluoropolyoxetane.

20. A method of filtering a fluid, the method comprising passing the fluid through the composite hydrophilic porous membrane of claim 1.

* * * * *